United States Patent [19]

Pospischil et al.

[11] Patent Number: 4,901,015
[45] Date of Patent: Feb. 13, 1990

[54] AMBIENT ELECTROMAGNETIC FIELD COMPENSATING MAGNETIC PICK-UP CIRCUIT FOR INTEGRATED DRIVE GENERATORS

[75] Inventors: Edwin L. Pospischil, South Beloit; Otto W. Dschida, Rockford, both of Ill.

[73] Assignee: Sundstrand Corporation, Rockford, Ill.

[21] Appl. No.: 247,133

[22] Filed: Sep. 21, 1988

[51] Int. Cl.$^4$ .............................................. G01B 7/30
[52] U.S. Cl. ................................ 324/207.17; 324/174
[58] Field of Search ............... 324/166, 167, 173, 174, 324/178, 179, 207, 208; 310/155

[56] References Cited

U.S. PATENT DOCUMENTS

| | | | |
|---|---|---|---|
| 3,002,384 | 10/1961 | MacDonald et al. | 324/173 X |
| 3,616,687 | 11/1971 | Wignall | 324/174 X |
| 3,835,373 | 9/1974 | Matula | 324/208 |
| 3,961,214 | 6/1976 | Lokkart | 310/155 |
| 3,984,713 | 10/1976 | Presley | 310/155 |
| 4,097,756 | 6/1978 | Gee | 310/155 |
| 4,150,314 | 4/1979 | Zabler et al. | 324/208 X |
| 4,276,489 | 6/1981 | Dron | 310/155 |
| 4,369,405 | 1/1983 | Sato et al. | 324/174 |
| 4,405,896 | 9/1983 | Akita | 324/208 |
| 4,432,245 | 2/1984 | Hattori et al. | 73/862.32 |
| 4,647,892 | 3/1987 | Hewitt | 336/83 |
| 4,712,433 | 12/1987 | Hochstein et al. | 73/862.36 |

Primary Examiner—Reinhard J. Eisenzopf
Assistant Examiner—Warren S. Edmonds
Attorney, Agent, or Firm—David B. Hitt

[57] ABSTRACT

This invention relates to a magnetic pick-up circuit for use in integrated drive generators of the type employed on board aircraft for power generation. Prior art magnetic pick-up circuits failed to compensate for interference due to operation within an ambient electromagnetic field or failed to preserve the ambient electromagnetic field. The magnetic pick-up circuit includes in combination a first coil responsive to an ambient electromagnetic field and a modulated flux field and a second coil responsive to the ambient electromagnetic field connected to the first coil in opposition to thereby insure that a signal induced by the ambient electromagnetic in the first coil is cancelled by a signal induced by the ambient electromagnetic field in the second coil. Means for providing an output signal representative of modulation of the modulated flux field are coupled to the first coil and the second coil. This output signal is free from distortion due to the ambient electromagnetic field.

20 Claims, 7 Drawing Sheets

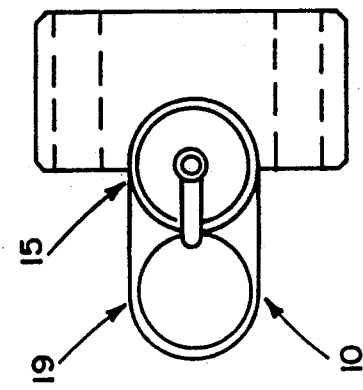
FIG. 7D
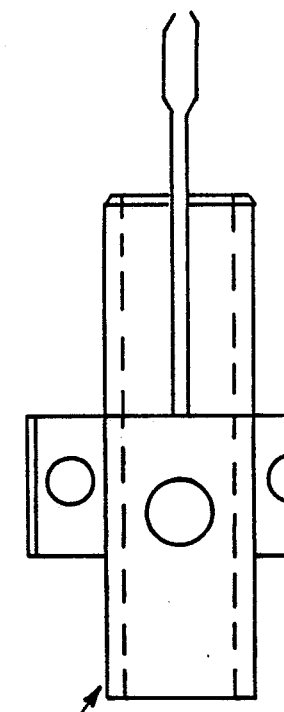
FIG. 7B
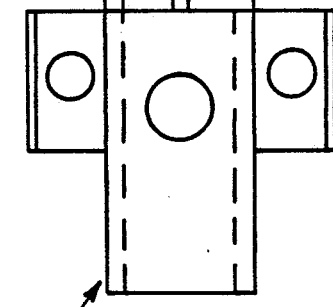
FIG. 7C
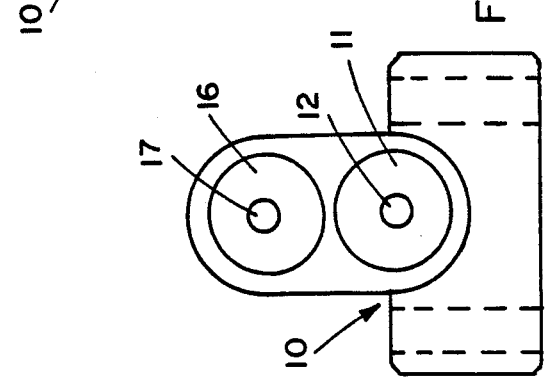
FIG. 7A
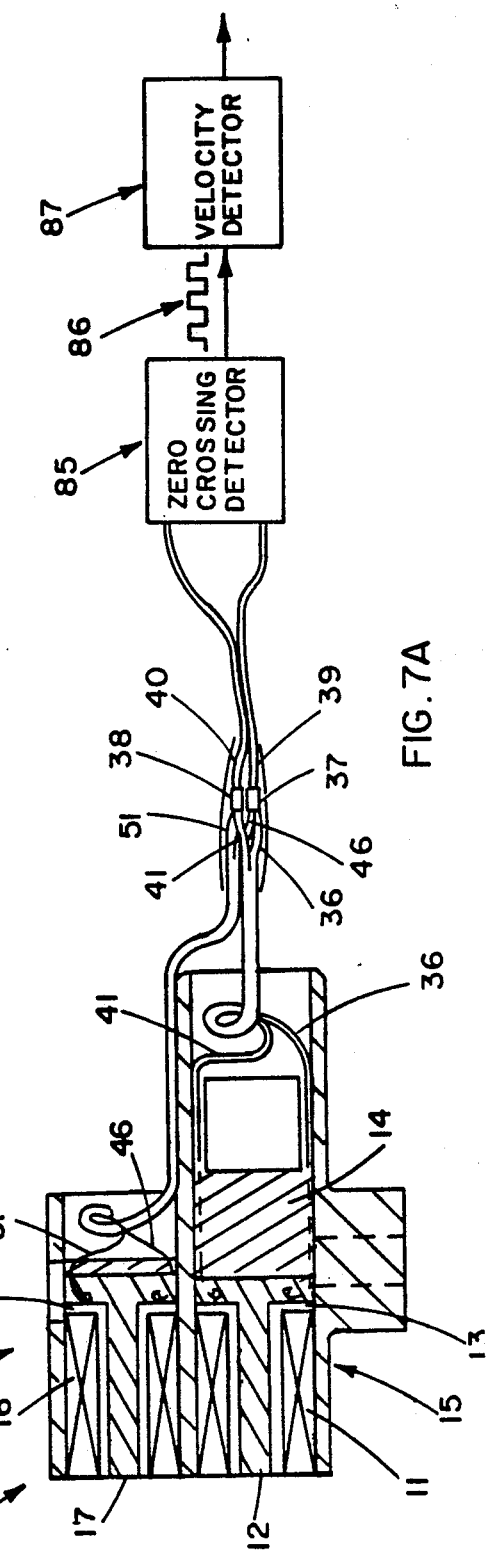

AMBIENT ELECTROMAGNETIC FIELD COMPENSATING MAGNETIC PICK-UP CIRCUIT FOR INTEGRATED DRIVE GENERATORS

TECHNICAL FIELD

This invention relates to a magnetic pick-up circuit of the type used in an integrated drive generator ("IDG") to determine the rotational velocity of a component in the IDG where the IDG's generator creates an ambient electromagnetic field in which the magnetic pick-up circuit will operate.

BACKGROUND ART

Magnetic pick-up circuits, in the general sense, are not new. For years, different applications have demanded detection of the velocity or position of rotating shafts. The most efficient and reliable way to detect the velocity of a rotating shaft is to use the effect of magnetic induction rather than by sensing shaft motion directly by mechanical means.

Early on, where mechanical means were employed to detect shaft velocity, it was realized that mechanical variations between elements of the mechanical means could give rise to false readings as to shaft velocity. Therefore, prior to art devices incorporated various schemes to circumvent the problem of mechanical variations. Magnetic pick-up arrangements appear to provide an answer to problems of this nature. Magnetic pick-up arrangements involved in the detection of speed or shaft position addressed some common technical concerns.

Typical of the prior art is the Sato et al. patent 4,369,405 which describes a rotational position detecting apparatus. A rotating shaft is fitted with a plurality of magnetic poles on the periphery thereof except at a portion thereof indicative of a rotational reference position. A pair of magnetically sensitive means having a mounting pitch therebetween related to the pitch of the magnetic poles is positioned to face the rotating magnetic poles so as to generate an output whose AC components are different in phase by one-half period from each other. A waveform shaping circuit including a differential circuit generates an output indicative of the difference between the output AC components of the pair of magnetic sensitive means. Further, a comparator compares the differential output of the differential circuit with a predetermined level to generate a rectangular wave output. The effect of this combination is that mechanically induced variations affecting the rotating magnetic poles cancel each other. However, Sato et al. require a rotational reference in order to overcome a totally symmetrical cancellation of the signals produced by the pair of magnetic sensitive means. Sato et al. do not entertain the presence of an ambient electromagnetic field as does the invention to be described herein. Further, the rotating magnetic field of Sato et al. would be deleterious to a proximate generator's electromagnetic field due to the electromagnetic interference such a rotating field would create.

The Presley U.S. Pat. No. 3,984,713 is directed to a magnetic speed sensor with a compensating pole. Presley requires the presence of a tone wheel driven by a vehicle and subject to axial misalignment and vibration. The tone wheel is made of magnetic material and has a continuous portion and a toothed portion. Sensing means is placed proximate to the tone wheel and consists of a sensing pole at one side of the tone wheel proximate to the toothed portion, and a compensating pole at the same side of the tone wheel proximate the continuous portion and remote from the toothed portion. In this manner, mechanical vibration induced in the tone wheel results in equal but opposite electric signals being induced in each of the sensing pole and compensating pole. The signals from these poles are added together to cancel each other out, leaving only the signal from the sensing pole produced by the toothed portion of the tone wheel. This signal is, of course, indicative of the velocity of the tone wheel. The invention of the Presley patent, like that of Sato et al., does not concern itself with the presence of an ambient electromagnetic field as in the invention to be described.

The Lokkart U.S. Pat. No. 3,961,214 is directed to a velocity pick-up and employs a similar scheme for cancellation of undesirable signals caused by mechanical vibration or other nonrotational stimulus. Lokkart requires a member rotatable about an axis, which member is mounted to a base and a magnetic rotor fixed relative to the member in a position to move therewith continuously past pick-ups. The rotor is fitted with a set of equally and angularly spaced teeth separated by valleys. A pair of magnetic pick-ups is placed proximate to the rotor, the ends of the pick-up closest to the teeth being spaced apart in the direction of movement thereof. The spacing of the pick-ups is related to the spacing of the teeth. Cancellation of the undesirable signals is accomplished by this spacing scheme, which causes signals produced by the pick-ups not due to rotation of the rotatable member to be cancelled due to their equal but opposite effect on each of the pick-ups. The presence of an ambient electromagnetic field is not a part of the environment in which the Lokkart invention is to function as is the case with the invention to be described.

Other prior art has merely applied the idea of providing magnetic pick-ups to other, less germaine situations.

The Hewett U.S. Pat. No. 4,647,892 is directed to an electronic speedometer which includes a dual magnetic sensor that requires an elongated cylindrical bobbin secured within a magnet and a pair of coils coaxially wound upon and along the length of the bobbin so as to sense equally and independently any disturbance of a magnetic field. In Hewett, the coils act entirely independently; there is no noise cancellation, merely symmetry. More importantly, there is no concern regarding an ambient electromagnetic field.

The Dron et al. U.S. Pat. No. 4,276,489 is directed to a multiple coil electromagnetic pick-up speed measuring device which requires two assemblies, each comprising an axial arrangement of a coil in a straight magnet, arranged end to end, only the coil of each assembly being housed in a solid piece of magnetic material. Dron follows the same line of thought as Hewett. Dron goes one step further by magnetically insulating two magnetic pick-up assemblies and packaging them in one housing. Again, magnetic symmetry is present, but ambient electromagnetic field cancellation is not.

None of the aforementioned inventions were designed to overcome the problem of interference due to operation within an ambient electromagnetic field. Furthermore, these inventions never reduced interference levels by parallel connection of dual pick-up coils as will be described hereinafter. Finally, none of these inventions contemplated operating in close proximity to a generator where their creation of moving magnetic fields could harm the generator's field. Applicant's invention is the first to address the problem of cancelling a signal produced by an ambient electromagnetic field while preserving the ambient electromagnetic field and a signal produced by a modulated flux field.

DISCLOSURE OF INVENTION

It is therefore a primary object of this invention to provide a magnetic pick-up circuit which provides an output signal representative of the modulation of a modulated flux field which output signal is free from distortion due to an ambient electromagnetic field.

Another object of the invention is to provide a magnetic pick-up circuit which disturbs the ambient electromagnetic generator field the least.

Yet another object of the invention is to provide a magnetic pick-up circuit which fits within the narrow confines of an IDG.

Still another object of the invention is to provide a magnetic pick-up circuit wherein a flux field is produced by a permanent magnet and is modulated by a plurality of moving ferrous lobes.

A still further object of the invention is to provide a magnetic pick-up circuit wherein a plurality of moving ferrous lobes is fixedly mounted periodically about a rotating shaft.

A still further object of the invention is to provide a magnetic pick-up circuit wherein a first coil is fixedly mounted proximate to a permanent magnet and a plurality of moving ferrous lobes.

Yet a further object of the invention is to provide a magnetic pick-up circuit wherein a second coil is fixedly mounted adjacent to and in parallel with a first coil.

Another object of the invention is to provide a magnetic pick-up circuit wherein the first coil and the second coil are connected in opposition.

A final object of the invention is to provide a magnetic pick-up circuit wherein means are coupled to the first coil and second coil which connect the first coil and second coil in parallel.

In the attachment of the foregoing objects, the apparatus that encompasses the preferred embodiment of the invention includes a frame having a first bore and a second bore parallel with the first bore. The frame is fixedly mounted proximate to a rotating shaft. A permanent magnet and a first coil are disposed within the first bore. The first coil is responsive to an ambient electromagnetic field, produced by a generator located within the IDG, and a modulated flux field. The modulated flux field is produced by the permanent magnet and a plurality of moving ferrous lobes fixedly mounted periodically about the rotating shaft. A second coil is disposed within the second bore and is responsive to the same ambient electromagnetic field. The first coil and the second coil are connected in opposition. The second coil is differentially connected to the first coil to thereby ensure that a signal induced by the ambient electromagnetic field in the first coil is cancelled by a signal induced by the ambient electromagnetic field in the second coil. Differential connection is accomplished by parallel connection of the first coil and the second coil. Means for producing an output signal representative of the modulation of the flux field are coupled to the first coil and the second coil. The output signal produced by these means is free from distortion due to the ambient electromagnetic field.

Other objects and advantages of the present invention will be apparent upon reference to the accompanying description when taken in conjunction with the following drawings:

BRIEF DESCRIPTION OF DRAWINGS

FIG. 7A is a full section view of a magnetic pick-up coil arrangement embodying the invention;

FIG. 7B is a top view of the magnetic pick-up coil arrangement of FIG. 7A;

FIG. 7C is a lefthand end view of the magnetic pick-up coil arrangement of FIG. 7A;

FIG. 7D is a righthand end view of the magnetic pick-up coil arrangement of FIG. 7A;

BEST MODE FOR CARRYING OUT INVENTION

Figure 1:
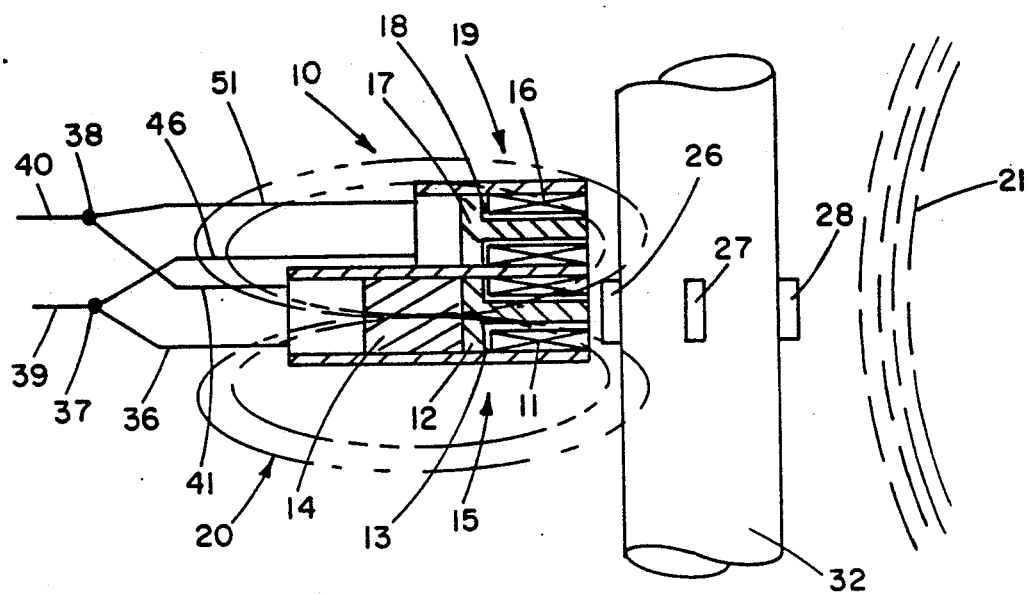
FIG. 1 in schematic form illustrates the magnetic pick-up circuit and its electromagnetic environment.

FIG. 1 shows a magnetic pick-up circuit 10 comprising a permanent magnet 14, an MPU coil 15 and a search coil 19. The MPU coil 15 comprises a first winding 11, a first pole piece 12, a first bobbin 13, a first MPU coil wire 36 and a second MPU coil wire 41. The search coil 19 comprises a second winding 16, a second pole piece 17, a second bobbin 18, a first search coil wire 46 and a second search coil wire 51. The first and second MPU coil wires 36 and 41 and the first and second search coil wires 46 and 51 are joined at a first junction 37 and a second junction 38 in parallel to form leads 39 and 40. These elements will be described hereinafter in greater detail. Ferrous lobes 26, 27 and 28 rotate on an input shaft 32, modulating a flux field 20, created by the permanent magnet 14. An ambient electromagnetic field 21 is present around the magnetic pick-up circuit 10. The ambient electromagnetic field 21 is shown off to the right of the components of FIG. 1 but in actuality intersects the windings 11, 16 of the MPU coil 15 and search coil 19.

Figure 8:
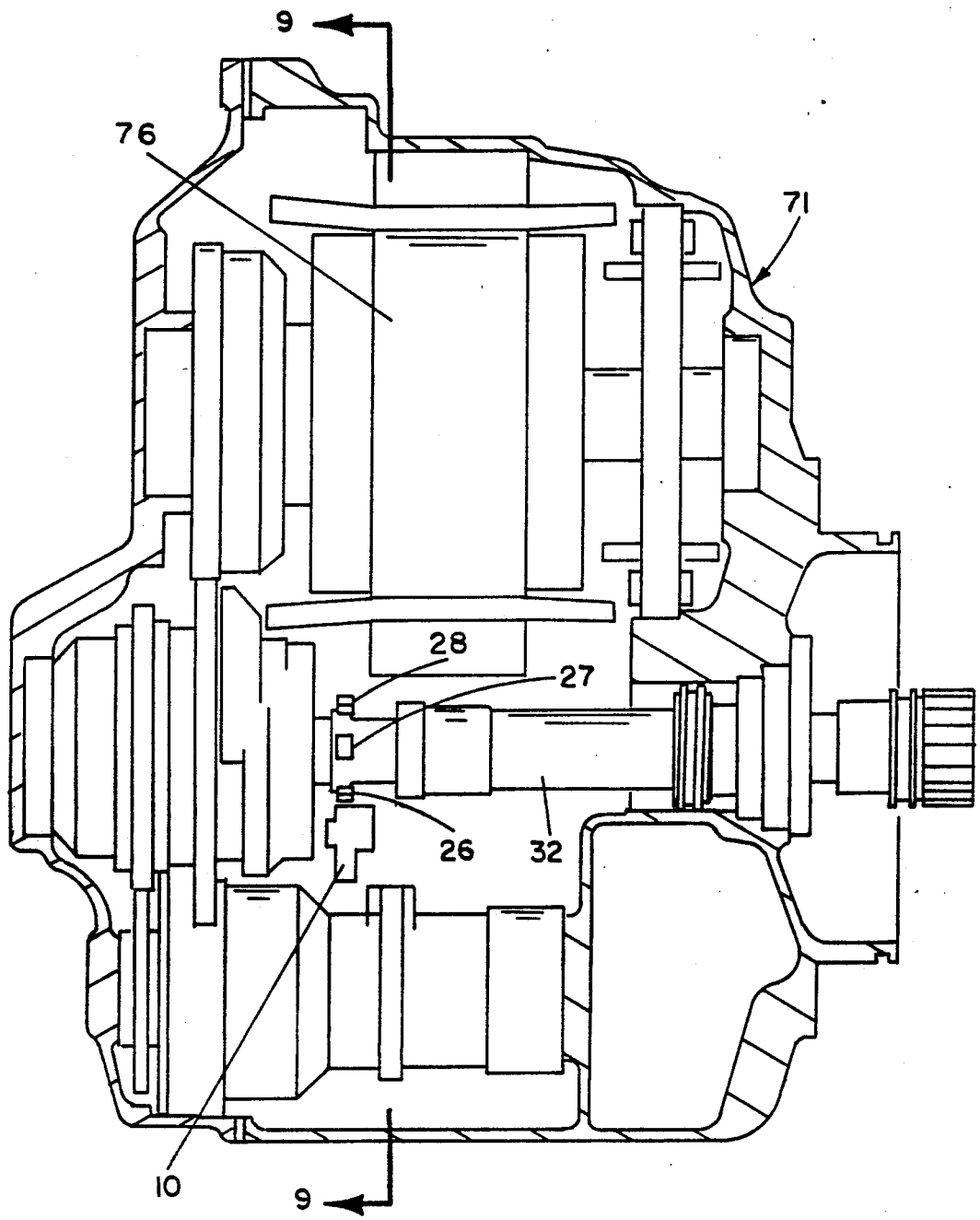
FIG. 8 is a side full section view of an IDG with a magnetic pick-up circuit embodying the invention, in place.
Figure 9:
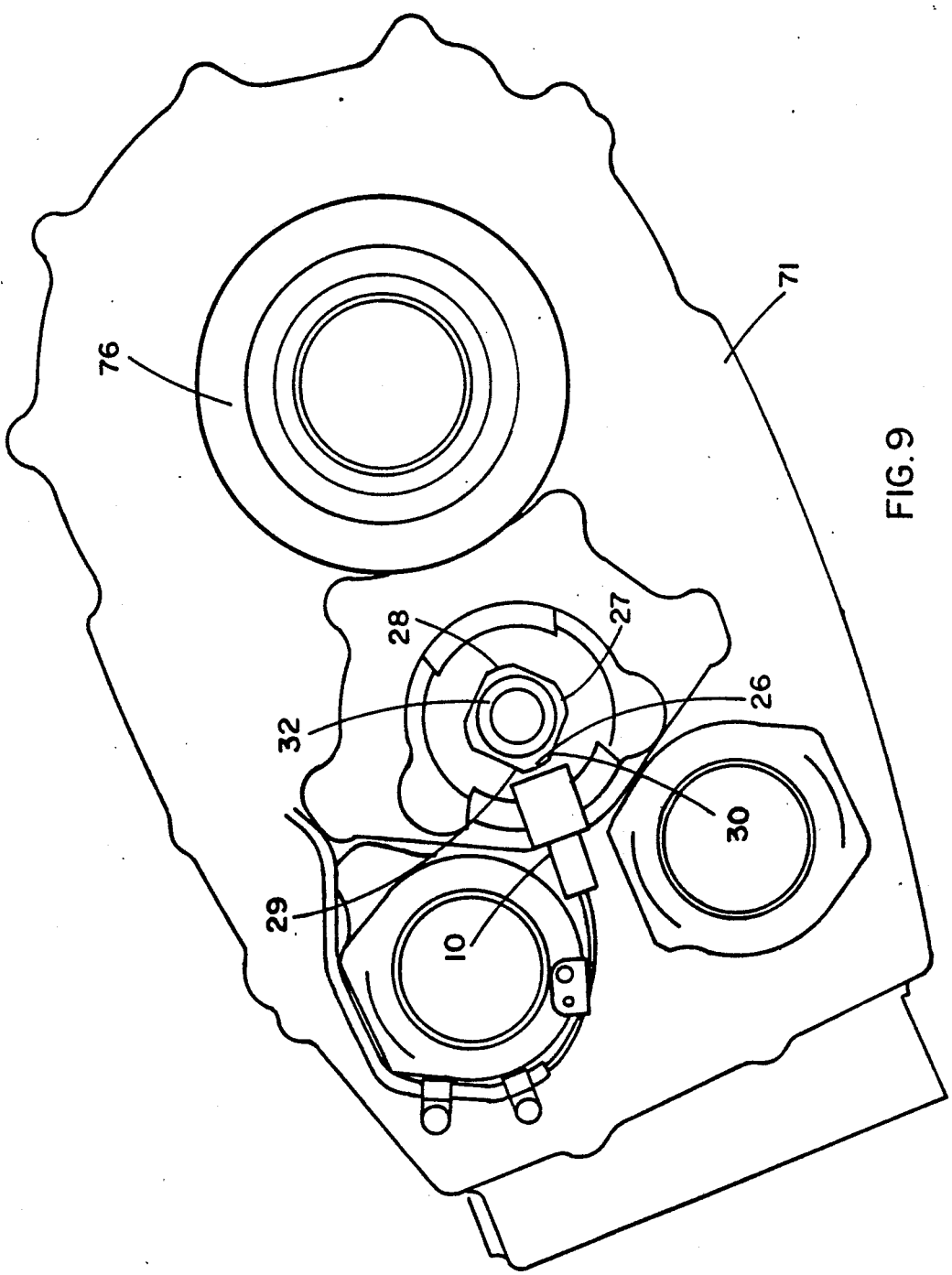
FIG. 9 is a partial end view section of the IDG of FIG. 8.

FIGS. 8 and 9 show the magnetic pick-up circuit 10 within an IDG 71. FIG. 9 shows four ferrous lobes, three of which are referenced as 26, 27 and 28. Ferrous lobe 26 has a front edge 29 and a back edge 30. Ferrous lobes 27 and 28 have corresponding, but unreferenced, front and back edges. FIGS. 8 and 9 also show a generator 76 which produces the ambient electromagnetic field 21.

Reference is now made to FIGS. 1, 8 and 9 which are to be studied in conjunction with this description and show the magnetic pick-up circuit 10 embodying the invention residing within its electromagnetic and physical environments. An input shaft 32 rotates at a variable velocity which is a function of the speed of a jet engine (not shown) which drives it. A plurality of ferrous lobes 26, 27 and 28 (made of magnetic steel in the preferred embodiment) is secured to and surrounds the input shaft 32 at one point along its length. In the preferred embodiment of the invention, four ferrous lobes are provided about the input shaft 32 each spaced at a 90° interval. Three of the four ferrous lobes 26, 27 and 28 are shown and are spaced regularly about the input shaft 32. A permanent magnet 14 (made of samarium cobalt in the preferred embodiment) is fixedly placed adjacent to the ferrous lobes 26, 27 and 28. A first pole piece 12 (made of magnetic steel in the preferred embodiment) is fixed to the pole of the permanent magnet 14 proximate the ferrous lobes 26, 27 and 28. A first magnetic pick-up coil ("MPU coil") 15 is placed between to the ferrous lobes 26, 27 and 28 and the permanent magnet 14. The MPU coil 15 comprises a first bobbin 13 (made of torlon, a commercially available product, in the preferred embodiment) about which is a helically wound a first winding 11 (made of coated copper wire in the preferred embodiment) having two ends connected to leads 36, 41, FIG. 7A. The MPU coil 15 surrounds one end of the first pole piece 12 and is held stationary by means not shown while the input shaft 32 rotates. This rotation causes the ferrous lobes 26, 27 and 28 to pass rapidly and consistently past the first pole piece 12 and the MPU coil 15 creating a modulated flux field 20 by modulating magnetic reluctance. The interior of the IDG 71 is confined, which results in the generator 76 being placed in close proximity to the magnetic pick-up circuit 10 subjecting the magnetic pick-up circuit 10 to interference. The magnetic pick-up circuit 10 must fit within these narrow confines.

Figure 5:
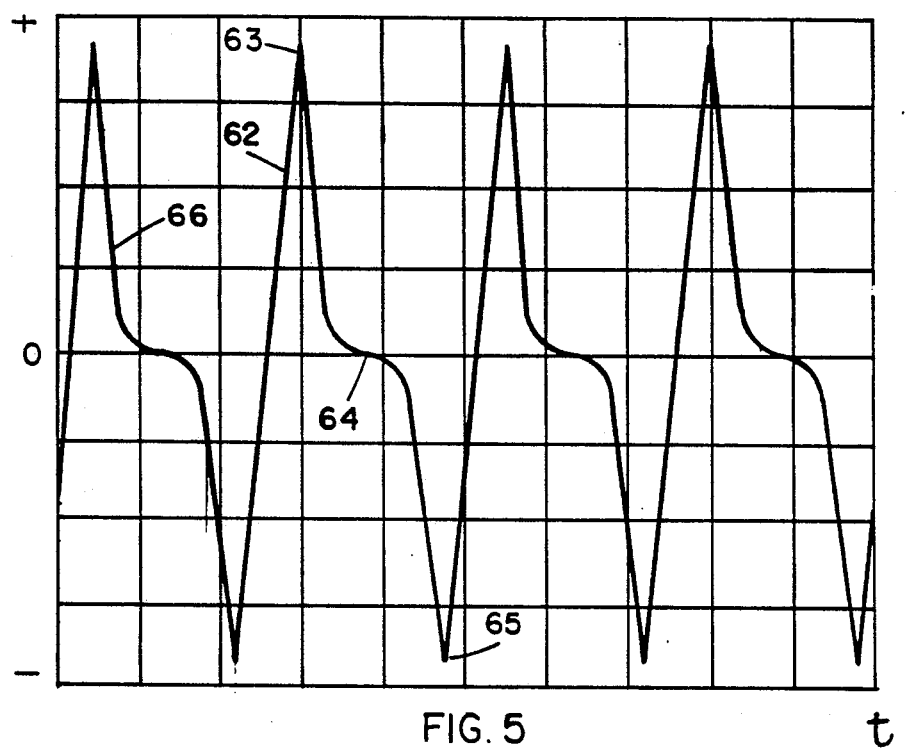
FIG. 5 is a representation of the signal produced in a first magnetic pick-up coil by a modulated flux field.

FIG. 5 shows a modulated flux signal 66 induced within the winding 11 of the MPU coil 15. The modulated flux signal 66 comprises a rising edge 62, a zenith 63, a midpoint 64 and a nadir 65. Referring now to FIGS. 1, 5 and 9, as each ferrous lobe 26, 27 and 28 passes the MPU coil 15, the flux field 20 is traversed, changing its flux path and inducing a current hereinafter referred to as the modulated flux signal 66 in the first winding 11. The frequency and amplitude of this modulated flux signal 66 produced by the MPU coil 15 depend upon the rotational velocity of the input shaft 32. This modulated flux signal 66 consists of a rising edge 62, caused by a change in magnetic reluctance due to the passage of the front edge 29 of the ferrous lobe 26 in front of the first pole piece 12. A zenith 63 occurs when the front edge 29 of the ferrous lobe 26 is directly over the first pole piece 12. Following passage of the front edge 29, the modulated flux signal 66 drops to a midpoint 64. As the back edge 30 of the ferrous lobe 26 approaches the first pole piece 12, the modulated flux signal 66 drops, culminating in a nadir 65 when the back edge 30 of the ferrous lobe 26 is directly over the first pole piece 12. Following passage of the back edge 30, the modulated flux signal 66 returns to zero, awaiting the approach of yet another ferrous lobe 27.

Figure 3:
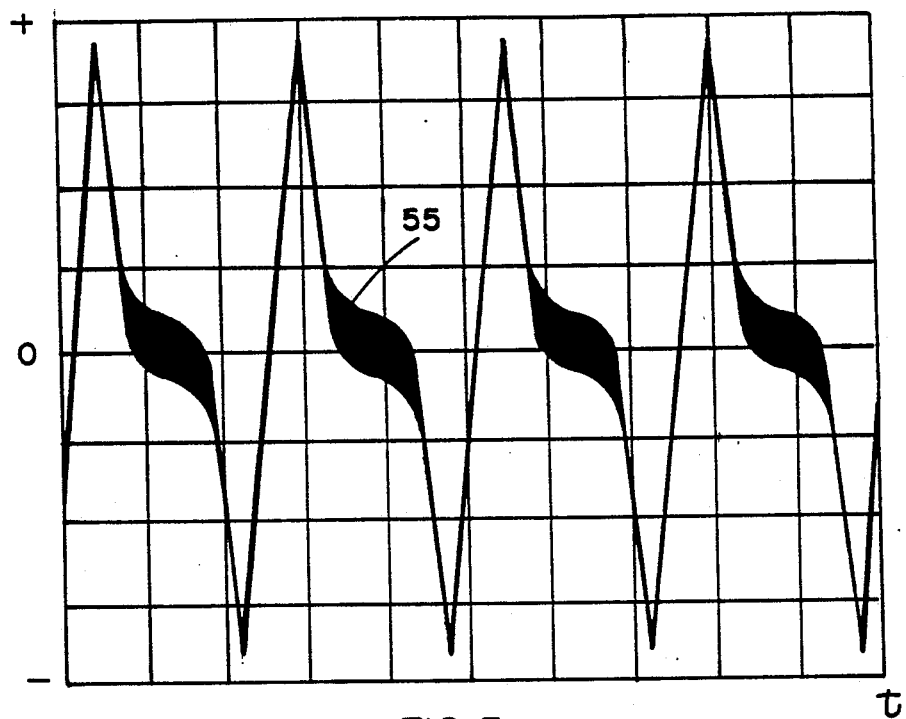
FIG. 3 is a representation of a distorted signal produced when a prior art magnetic pick-up circuit operates within an IDG.
Figure 4:
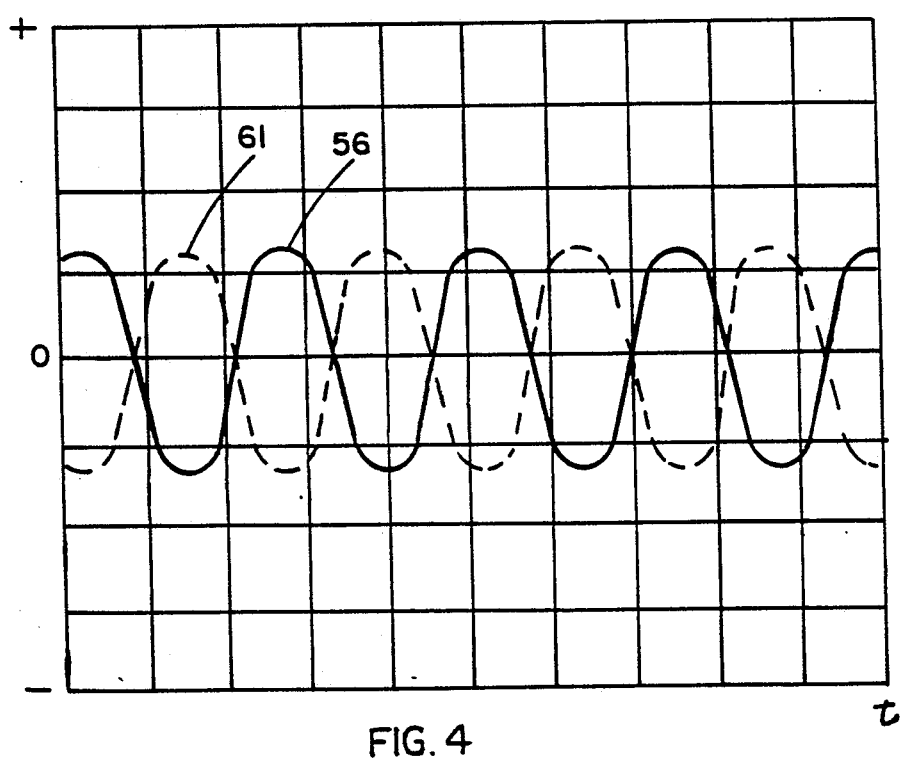
FIG. 4 depicts the signals produced in a first and second magnetic pick-up coils by an ambient electromagnetic field.

FIG. 3 shows a distorted signal 55. FIG. 4 shows first and second signals 56 and 61 induced by the ambient electromagnetic field 21 in windings 11 and 16 of coils 15 and 19 which will be hereinafter described.

Referring now to FIGS. 1, 3, 4, 5 and 8, an ambient electromagnetic field 21 (shown as a series of broken arcuate lines in FIG. 1) oscillates at a constant 400 Hz frequency and entirely surrounds the MPU coil 15. The ambient electromagnetic field 21 is produced by a generator 76 (see FIG. 8) proximate to the magnetic pick-up circuit 10 which generates three phase electrical power suitable for use by aircraft electrical systems. The ambient electromagnetic field 21 induces a current hereinafter referred to as the first signal 56, FIG. 4, in the first winding 11 in the MPU coil 15. The first signal 56 and the modulated flux signal 66, see FIG. 4, superpose upon one another within the MPU coil 15, creating a distorted signal 55, FIG. 3, which contains both the first signal 56 and the modulated flux signal 66.

Referring now to FIGS. 1 and 4, a second pick-up coil ("search coil") 19 is located adjacent and parallel to the MPU coil 15. The search coil 19 is constructed of the same materials and in the same way as the MPU coil 15. The search coil 19 comprises (as does the MPU coil 15) a second bobbin 18 about which is a helically wound second winding 16 having two ends 46, 51, FIG. 7A. A second pole piece 17 is placed concentrically within the second bobbin 18. The second pole piece 17 has no function apart from assuring that the search coil 19 behaves electromagnetically the same as the MPU coil 15. The second winding 16 of the search coil 19 is wound in the same direction as the first winding 11 of the MPU coil 15. Although the search coil 19 and the MPU coil 15 are wound in the same direction, they are connected in parallel opposition, which causes an identical electromagnetic source to induce identical signals in both the search coil 19 and the MPU coil 15; however, the signals are 180° out of phase due to connection in parallel opposition. The signals induced are forced to be 180° out of phase by the placement of the MPU coil 15 and the search coil 19 in parallel alongside one another and in parallel with the wavefronts of the ambient electromagnetic field 21. With such placement, the wavefronts of the ambient electromagnetic field 21 impinge simultaneously upon the MPU coil 15 and the search coil 19. Simultaneous impingement upon opposition-connected coils insures 180° phase displacement. The search coil 19 is placed sufficiently far from the flux field 20 so that it is not affected by modulation of the flux field 20 due to motion of the ferrous lobes 26, 27 and 28. The search coil 19, however, is still subject to the 400 Hz ambient electromagnetic field 21. The ambient electromagnetic field 21 induces a current hereinafter referred to as the second signal 61 in the second winding 16 in the search coil 19. Again, is to be noted that, because the search coil 19 is connected in opposition with the MPU coil 15, the first signal 56 is exactly 180° out of phase with the second signal 61. Therefore, the search coil 19 also responds to the ambient electromagnetic field 21 by producing a second signal 61 representing its pulsation.

Referring now to FIGS. 8 and 9, it should be noted that the input shaft 32 could be fitted with a plurality of rotating permanent magnets instead of ferrous lobes, eliminating the need for a permanent magnet 14. The rotating permanent magnets would themselves create a rotating moving flux which could then be detected by the MPU coil 15. However, the rotating moving flux would induce distortions in the ambient electromagnetic field 21 of the generator 76, disrupting its operation and decreasing its efficiency.

Figure 2:
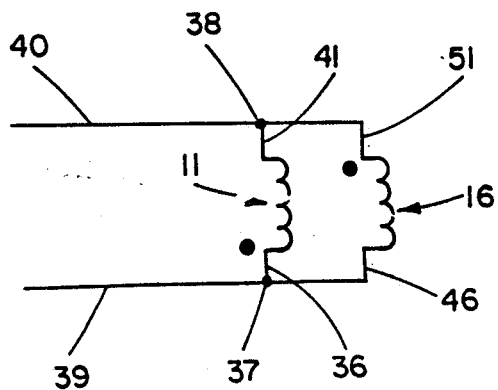
FIG. 2 is an electrical schematic of a magnetic pick-up circuit embodying the invention.

FIG. 2 shows, in schematic form, the MPU coil 15, the search coil 19, the first and second MPU coil wires 36 and 41, the first and second search coil wires 46 and 51, the first and second junctions 37 and 38 and the leads 39 and 40. FIGS. 7A–7D show the above elements plus permanent magnet 14, first and second pole pieces 12 and 17, first and second bobbins 13 and 18 and first and second windings 11 and 16. Finally, FIG. 7A shows a zero crossing detector 85, a zero crossing signal 86 and a velocity detector 87. These elements will be discussed hereinafter.

Figure 6:
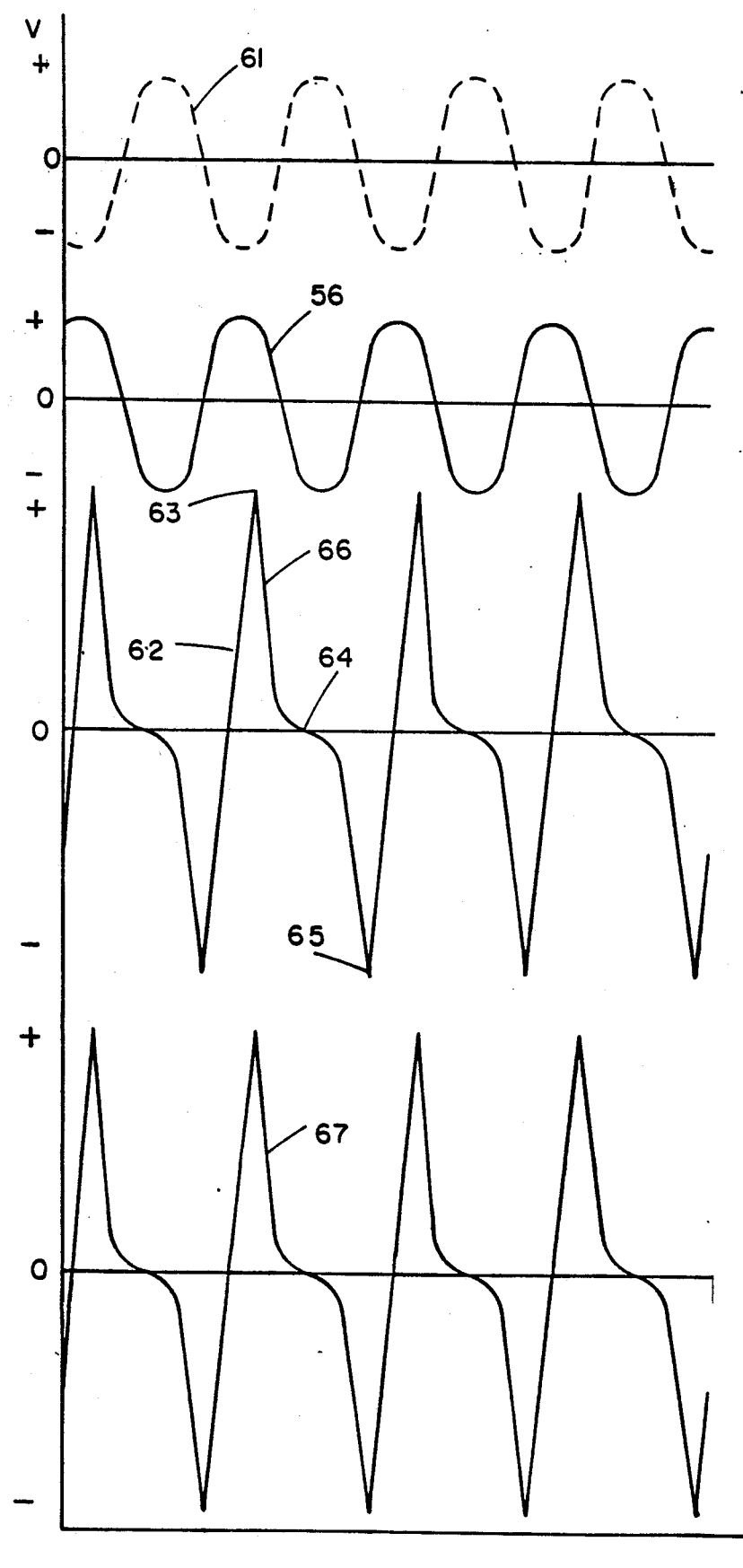
FIG. 6 shows the progression of signals into and out of the magnetic pick-up circuit.

Referring now to FIGS. 1, 2 and 7A, a first MPU coil wire 36 and a second MPU coil wire 41 lead from the two ends of the first winding 11 shown but not referenced in FIG. 7A. A first search coil wire 46 and a second search coil wire 51 lead from the two ends of the second winding 16. The first MPU coil wire 36 and the first search coil wire 46 are joined at junction 37. The second MPU coil wire 41 and the second search coil wire 51 are similarly joined at junction 38. This results in the first winding 11 of the MPU coil 15 and the second winding 16 of search coil 19 being connected in parallel. Referring now to FIG. 6, this parallel connection superposes the first signal 56 and the modulated flux signal 66 (emanating from the MPU coil 15) upon the second signal 61 (emanating from the search coil 19), resulting in an output signal 67. Parallel connection also causes the signals 56, 61 and 66 produced by the coils 15 and 19 to be one-half their normal amplitude taken in conjunction. Interference in zero crossing, as demonstrated in the distorted signal 55, FIG. 3, due to the interaction of the 400 Hz ambient electromagnetic field 21 is halved thereby. This halving ultimately results in further noise reduction.

Referring now to FIG. 7A, the first MPU coil wire 36 and the first search coil wire 46 connected at first junction 37, and the second MPU coil wire 41 and the second search coil wire 51, connected at second junction 38, lead via electrical leads 39 and 40 to a zero crossing detector 85 which takes as its input the output signal 67. The output signal 67, it will be recalled, is comprised of the combination of the first signal 56, second signal 61 and the modulated flux signal 66 produced by the MPU coil 15 and the search coil 19. The zero crossing detector 85, which is conventional, determines the points along the output signal 67 at which its amplitude crosses from positive to negative, and vice versa (i.e., when the output signal 67 crosses zero). The zero crossing detector 85 sends a zero crossing signal 86 to a velocity detector 87 which uses the zero crossing detector's 85 output to develop a signal (not shown) representing input shaft 32 velocity.

Referring now to FIGS. 1, 3 and 4, the magnetic pick-up circuit 10 eliminates a problem present by the use of prior art pick-ups or a single coil arrangement. Note that the object of the magnetic pick-up circuit 10 is to produce a signal which is accurately representative of shaft rotation, that is, a signal which possesses clearly defined zero crossings, so that a zero crossing detector might accurately determine crossings. Employment of a single pick-up coil would yield a distorted signal 55 comprising a first signal 56 and a modulated flux signal 66. It is evident that half of this distorted signal's 55 zero crossings are temporally diffused, creating ambiguity as to when a zero crossing occurs. In contrast, the output signal 67 contains narrow zero crossings 64 throughout which eliminate zero crossing ambiguity thereby producing accurate velocity detection.

Referring now to FIGS. 1, 8 and 9, shown is the magnetic pick-up circuit 10 as placed within an IDG 71. An IDG 71 comprises, inter alia, an input shaft 32 and a generator 76. Regardless of the rotational velocity of the input shaft 32, the generator 76 produces constant 400 Hz electrical power for use in powering aircraft electrical systems. As a by-product of the production of this 400 Hz power, the generator 76 produces an ambient 400 Hz electromagnetic field 21 which pervades the interior of the IDG 71. Since the magnetic pick-up circuit 10 is located within the IDG 71, it is subject to influence from this ambient electromagnetic field 21. In its quest to detect the speed of the rotating ferrous lobes 26, 27 and 28, the magnetic pick-up circuit 10 finds interference from the ambient electromagnetic field 21 in the form of zero crossing errors when the ambient electromagnetic field 21 frequency (400 Hz) approximates the ferrous lobe 26, 27 and 28 passage (flux field 20) frequency. Such approximation (or similarity) of frequencies gives rise to beating of the two fields 20 and 21 against one another (as shown in FIG. 3) and results in a distorted signal 55 thereby producing zero crossing errors. This is the reason for the inclusion of both an MPU coil 15 and a search coil 19, which are placed in electrical opposition substantially in parallel with the wavefronts of the 400 Hz ambient electromagnetic field 21. The magnetic pick-up circuit 10 must compensate for the presence of the ambient electromagnetic field 21 without substantially disturbing it.

From the foregoing description it is apparent that the invention described provides a novel magnetic pick-up circuit employing both an MPU coil and a search coil which, in combination, allow the sensing of the movement of a plurality of ferrous lobes and the cancelling of an 400 Mz ambient electromagnetic field which otherwise would distort the zero-crossing of an output signal representing flux field modulation by the moving ferrous lobes.

Although this invention has been illustrated and described in connection with the particular embodiments illustrated, it will be apparent to those skilled in the art that various changes may be made therein without departing from the spirit of the invention as set forth in the appended claims.

I claim:

1. A magnetic pickup circuit operating within an enclosure adjacent a single source emanating an ambient electromagnetic field, comprising:

a first coil responsive to said ambient electromagnetic field emanating from said single source and a modulated flux field;

a second coil responsive to said ambient electromagnetic field connected to said first coil in opposition and positioned such that wavefronts of said ambient electromagnetic field simultaneously impinge on said first and second coils to thereby ensure that a signal induced by said ambient electromagnetic field in said first coil is cancelled by a signal induced by said ambient electromagnetic field in said second coil; and means coupled to said first coil and said second coil for providing an output signal representative of modulation of said modulated flux field, which output signal is free from distortion due to said ambient electromagnetic field.

2. The magnetic pick-up circuit as recited in claim 1, wherein:

said modulated flux field is produced by a permanent magnet providing a flux field and a plurality of ferrous lobes moving through said flux field thereby providing modulation.

3. The magnetic pick-up circuit as recited in claim 2, wherein:

said plurality of moving ferrous lobes is fixedly mounted periodically about a rotating shaft.

4. The magnetic pick-up circuit as recited in claim 3, wherein:
said first coil is fixedly mounted proximate to said permanent magnet and said plurality of moving ferrous lobes.

5. The magnetic pick-up circuit as recited in claim 4, wherein:
said second coil is fixedly mounted adjacent to and in parallel with said first coil.

6. The magnetic pick-up circuit as recited in claim 5, wherein:
said first coil and said second coil are connected in opposition.

7. The magnetic pick-up circuit as recited in claim 6, wherein:
said means coupled to said first coil and said second coil connect said first coil and said second coil in parallel.

8. A magnetic pick-up circuit operating within an enclosure adjacent a single source emanating an ambient electromagnetic field, comprising:
a frame having a first bore and a second bore parallel with said first bore;
a permanent magnet providing a flux field and a first coil disposed within said first bore, said first coil responsive to said ambient electromagnetic field emanating from said single source and modulation of said flux field;
a second coil disposed within said second bore responsive to said ambient electromagnetic field, positioned such that wavefronts of said ambient electromagnetic field simultaneously impinge on said first and second coils and differentially connected to said first coil to thereby ensure that a signal induced by said ambient electromagnetic field in said first coil is cancelled by a signal induced by said ambient electromagnetic field in said second coil; and
means coupled to said first coil and said second coil for providing an output signal representative of modulation of said flux field, which output signal is free from distortion due to said ambient electromagnetic field.

9. A magnetic pick-up circuit as recited in claim 8, wherein:
said flux field produced by said permanent magnet is modulated by a plurality of moving ferrous lobes.

10. A magnetic pick-up circuit as recited in claim 9, wherein:
said plurality of moving ferrous lobes is fixedly mounted periodically about a rotating shaft.

11. A magnetic pick-up circuit as recited in claim 10, wherein:
said frame is fixedly mounted proximate to said permanent magnet and said plurality of moving ferrous lobes.

12. A magnetic pick-up circuit as recited in claim 11, wherein:
said first coil and said second coil are connected in opposition.

13. A magnetic pick-up circuit as recited in claim 12, wherein:
said means coupled to said first coil and said second coil connect said first coil and said second coil in parallel.

14. A method for providing a distortion-free output signal representative of the modulation of a flux field within an enclosure adjacent a single source emanating an ambient electromagnetic field, comprising the steps of:
inducing a first signal and a modulated flux signal in a first coil, said first signal representing pulsation of said ambient electromagnetic field emanating from said single source and said modulated flux signal representing the modulation of said flux field;
substracting from said first signal a second signal induced in a second coil positioned such that wavefronts from said ambient electromagnetic field simultaneously impinge on said first and second coils, said second signal representing pulsation of the ambient electromagnetic field, to thereby ensure that said second signal nullifies said first signal cancelling distortion in an output signal due to said ambient electromagnetic field; and
producing said output signal representative of the modulation of only said flux field thereby eliminating distortion due to said ambient electromagnetic field.

15. The method for providing a distortion-free output signal representative of the modulation of the flux field as recited in claim 14, wherein:
said flux field is produced by a permanent magnet and is modulated by a plurality of moving ferrous lobes.

16. The method for providing a distortion-free output signal representative of the modulation of the flux field as recited in claim 15, wherein:
said plurality of moving ferrous lobes is fixedly mounted periodically about a rotating shaft.

17. The method for providing a distortion-free output signal representative of the modulation of the flux field as recited in claim 16, wherein:
said step of inducing said first signal comprises the step of surrounding said first coil with said ambient electromagnetic field and the step of inducing said modulated flux signal comprises the step of fixedly mounting said first coil proximate to said permanent magnet and said plurality of moving ferrous lobes.

18. The method for providing a distortion-free output signal representative of the modulation of the flux field as recited in claim 17, wherein:
the step of subtracting from said first signal said second signal comprises the steps of fixedly mounting said second coil adjacent to and in parallel with said first coil, surrounding said second coil with said ambient electromagnetic field, and opposing said second signal induced thereby with said first signal.

19. The method for providing a distortion-free output signal representative of the modulation of the flux field as recited in claim 18, wherein:
the step of opposing said second signal with said first signal comprises the step of connecting said first coil and said second coil in parallel opposition.

20. The method for providing a distortion-free output signal representative of the modulation of the flux field as recited in claim 19, wherein:
said ambient electromagnetic field emanates from a generator.

* * * * *